(12) United States Patent
Novoselac

(10) Patent No.: US 11,051,463 B2
(45) Date of Patent: Jul. 6, 2021

(54) PLANT CONTAINER

(71) Applicant: John Novoselac, Denver, CO (US)

(72) Inventor: John Novoselac, Denver, CO (US)

( * ) Notice: Subject to any disclaimer, the term of this patent is extended or adjusted under 35 U.S.C. 154(b) by 0 days.

(21) Appl. No.: 16/892,079

(22) Filed: Jun. 3, 2020

(65) Prior Publication Data
US 2020/0288644 A1    Sep. 17, 2020

Related U.S. Application Data

(63) Continuation of application No. 15/265,649, filed on Sep. 14, 2016, now Pat. No. 10,687,480.

(60) Provisional application No. 62/220,662, filed on Sep. 18, 2015.

(51) Int. Cl.
*A01G 9/04* (2006.01)

(52) U.S. Cl.
CPC ................................. *A01G 9/042* (2013.01)

(58) Field of Classification Search
CPC ................................. A01G 9/042; A01G 9/04
USPC ............................................. 47/66.7, 79, 80
See application file for complete search history.

(56) References Cited

U.S. PATENT DOCUMENTS

| | | | |
|---|---|---|---|
| 1,453,401 A | 5/1923 | Mattson | |
| 2,249,197 A * | 7/1941 | Brundin | A01G 27/008 47/64 |
| 2,652,027 A * | 9/1953 | Coyner | A01K 9/005 119/71 |
| 2,948,522 A * | 8/1960 | Peters | B22D 41/00 432/263 |
| 3,469,342 A * | 9/1969 | Morris | A47G 33/12 47/79 |
| 3,482,785 A * | 12/1969 | Chapin | A01G 27/008 239/542 |
| 3,729,142 A | 4/1973 | Rangel-Garza | |
| 4,149,340 A * | 4/1979 | DaVitoria-Lobo | A01G 31/02 47/79 |
| 4,651,468 A * | 3/1987 | Martinez | A01G 27/00 47/48.5 |
| 4,869,019 A | 9/1989 | Ehrlich | |
| 4,991,345 A * | 2/1991 | Bloch | A01G 27/00 47/65.5 |
| 5,209,015 A * | 5/1993 | De Filippi | A01G 27/003 47/48.5 |
| 5,212,905 A | 5/1993 | Philoctete | |
| 5,220,745 A * | 6/1993 | Elliott | A01G 27/005 47/62 R |
| 5,272,835 A * | 12/1993 | Stern | A01G 27/02 47/79 |
| 5,279,071 A * | 1/1994 | McDougall | A01G 27/003 428/16 |
| 5,567,308 A | 10/1996 | Visser | |
| 6,279,265 B1 * | 8/2001 | Scannell, Jr. | A01G 9/02 47/79 |
| D452,150 S | 12/2001 | Viner | |

(Continued)

*Primary Examiner* — Ebony E Evans
(74) *Attorney, Agent, or Firm* — Faegre Drinker Biddle & Reath LLP

(57) ABSTRACT

A plant growing system includes a base component; and a container disposed on top of the base component. The container includes a container body having a floor surface at a lower end, and a wall having a lower edge coupled to the floor surface and extending upward from the perimeter of the floor surface to an upper edge. A drainage port is disposed through the wall near the lower edge of the wall.

19 Claims, 6 Drawing Sheets

(56) References Cited

U.S. PATENT DOCUMENTS

| | | | | |
|---|---|---|---|---|
| 6,729,070 B1* | 5/2004 | Locke | ............... | A01G 27/00 47/79 |
| 7,093,391 B2* | 8/2006 | Eakin | ............... | A01G 9/04 47/39 |
| 7,641,070 B2* | 1/2010 | Ho | ............... | B65D 47/06 220/711 |
| 7,681,354 B2* | 3/2010 | Shepardson | ......... | A01G 27/005 47/40.5 |
| 8,628,032 B2 | 1/2014 | Feith | | |
| 9,043,962 B2* | 6/2015 | Trofe | ............... | A01G 9/247 |
| 9,095,799 B1 | 8/2015 | Packard | | |
| 9,185,853 B1 | 11/2015 | Ascherman | | |
| 2002/0017058 A1* | 2/2002 | Chung | ............... | A01G 27/06 47/79 |
| 2005/0115149 A1* | 6/2005 | Tanaka | ............... | A01G 27/003 47/79 |
| 2008/0257991 A1 | 10/2008 | Einav | | |
| 2016/0081283 A1* | 3/2016 | Pierce | ............... | A01G 27/005 47/80 |
| 2016/0128282 A1* | 5/2016 | Halferty | ............... | A01G 9/04 47/71 |
| 2017/0359964 A1* | 12/2017 | Persico | ............... | A01G 9/04 |

* cited by examiner

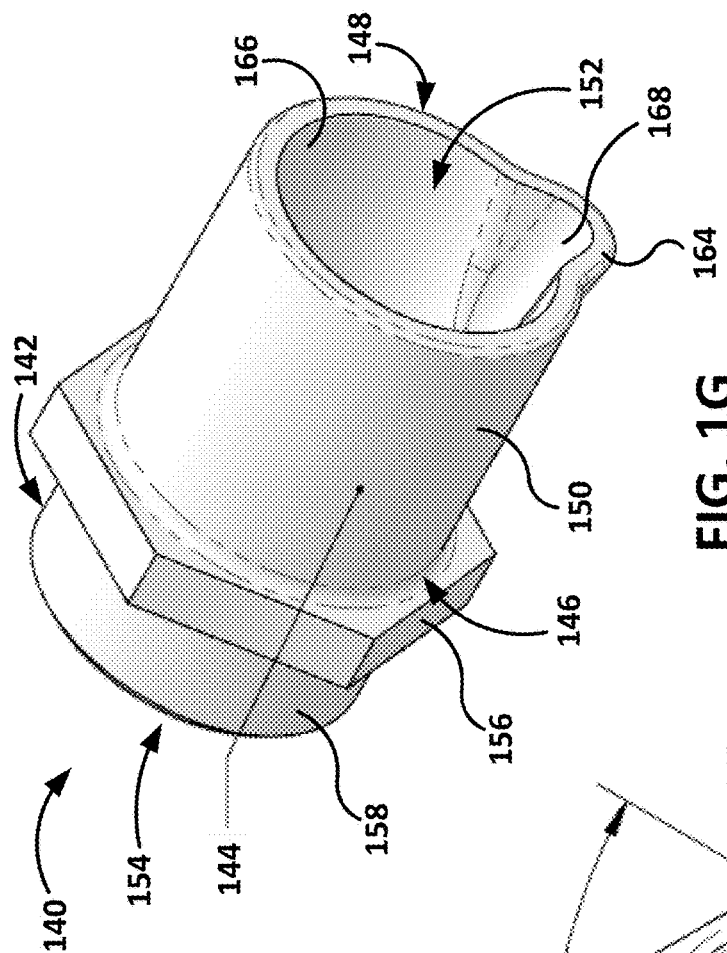
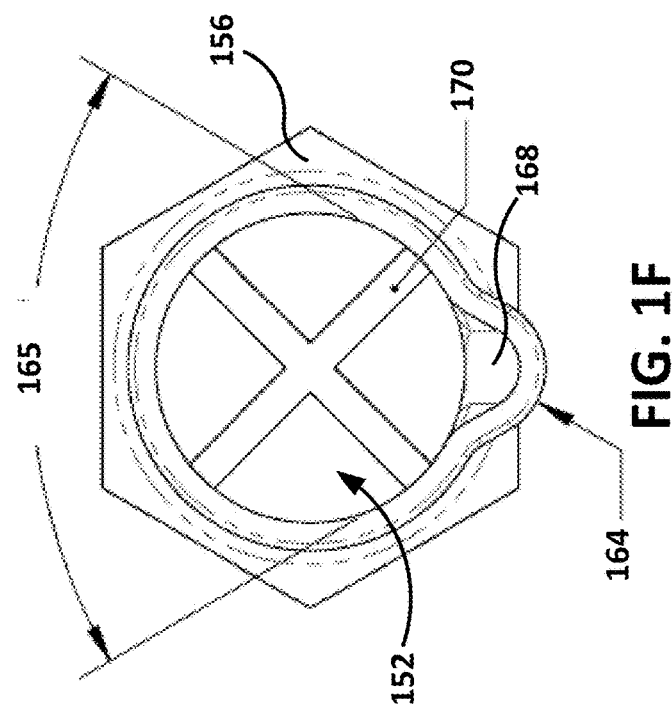

PLANT CONTAINER

CROSS-REFERENCE TO RELATED APPLICATIONS

This application is a continuation of application Ser. No. 15/265,649, filed Sep. 14, 2016, issued as U.S. Pat. No. 10,687,480 on Jun. 23,2020, which claims priority to Provisional Application No. 62/220,662, filed Sep. 18, 2015, which are hereby incorporated herein by reference in their entireties.

BACKGROUND

When growing a plant in a container, a plant grower typically must provide water and nutrient solution to the roots. This liquid is often applied, with some excess, to the top of the soil and allowed to naturally flow down and throughout the plant container, and then out through holes in the bottom of the container. Currently, growers typically either let the liquid spill onto a floor surface, or collect the liquid in a pan or tray in which the container is sitting. The liquid can either be left to evaporate or can be removed in any number of different ways, many of which may require constructing mechanisms for removing liquid from the tray in which the container is sitting.

SUMMARY

Embodiments of the subject matter disclosed herein may facilitate the efficient collection of excess run-off liquid (e.g., water and/or nutrient solution). Embodiments include a growing system having a container with a drainage port disposed in the wall of the container. In embodiments, the drainage port may be configured to be plumbed for liquid collection and/or may include a spout that may facilitate manual collection of the liquid. In this manner, for example, the liquid may be collected in a drainage system and/or a tray that may be completely detached from the plant container such that the liquid does not need to be collected from a tray in which the plant container sits.

In an Example 1, a plant growing system comprises: a base component; and a container disposed on top of the base component, wherein the container comprises: a container body having a floor surface at a lower end, and a wall having a lower edge coupled to the floor surface and extending upward from the perimeter of the floor surface to an upper edge; and a drainage port disposed through the wall near the lower edge of the wall.

In an Example 2, the system of Example 1, further comprising a drainage spout comprising a first portion that is configured to be communicably coupled to the drainage port.

In an Example 3, the system of Example 2, wherein the first portion of the drainage spout is configured to be at least partially inserted into the drainage port.

In an Example 4, the system of any of Examples 2 and 3, the drainage spout further comprising a second portion, the second portion comprising: a first end coupled to the first portion; a second end; and a wall extending away from the first portion between the first end and the second end.

In an Example 5, the system of Example 4, wherein the second end of the second portion comprises a protrusion configured to focus a stream of liquid exiting the container through the drainage spout.

In an Example 6, the system of Example 4, wherein the second end of the second portion is configured to be coupled to a conduit such that liquid exiting the container through the drainage spout flows into the conduit.

In an Example 7, the system of any of Examples 1 through 6, further comprising a gutter defined in the floor surface, wherein the gutter comprises a downward slope extending from a first end of the gutter to a second end of the gutter, wherein the second end of the gutter is disposed adjacent to the drainage port.

In an Example 8, the system of any of Examples 1 through 7, wherein the floor surface is sloped at least partially toward the drainage port.

In an Example 9, the system of any of Examples 4 through 8, wherein the drainage spout comprises an aperture defined in the second portion, wherein the aperture is configured to allow air to enter the container via the drainage port.

In an Example 10, the system of any of Examples 4 through 8, further comprising a grate disposed in at least one of the drainage port and the drainage spout, wherein the grate is configured to prevent a growing medium from exiting the container via the drainage port.

In an Example 11, a plant growing system comprises a base component; a container disposed on top of the base component, wherein the container comprises: a container body having a floor surface at a lower end, and a wall having a lower edge coupled to the floor surface and extending upward from the perimeter of the floor surface to an upper edge; and a drainage port disposed through the wall near the lower edge of the wall; and a drainage spout comprising: a first portion that is configured to be communicably coupled to the drainage port; and a second portion comprising a first end coupled to the first portion, a second end, and a wall extending away from the first portion between the first end and the second end.

In an Example 12, the system of Example 11, wherein the second end of the second portion comprises a protrusion configured to focus a stream of liquid exiting the container through the drainage spout.

In an Example 13, the system of Example 11, wherein the second end of the second portion is configured to be coupled to a conduit such that liquid exiting the container through the drainage spout flows into the conduit.

In an Example 14, the system of any of Examples 11 through 13, further comprising a gutter defined in the floor surface, wherein the gutter comprises a downward slope extending from a first end of the gutter to a second end of the gutter, wherein the second end of the gutter is disposed adjacent to the drainage port.

In an Example 15, the system of any of Examples 11 through 14, wherein the floor surface is sloped at least partially toward the drainage port.

In an Example 16, the system of any of Examples 11 through 15, wherein the drainage spout comprises an aperture defined in the second portion, wherein the aperture is configured to allow air to enter the container via the drainage port.

In an Example 17, the system of any of Examples 11 through 16, further comprising a grate disposed in at least one of the drainage port and the drainage spout, wherein the grate is configured to prevent a growing medium from exiting the container via the drainage port.

In an Example 18, a method of using the plant growing system of Example 11, the method comprising: inserting the first portion of the drainage spout into the drainage port of the container; covering the floor surface of the container with a grow medium; transplanting a plant into the container; providing a water collection system; and adding water to the grow medium in the container.

In an Example 19, the method of Example 18, further comprising sealing the drainage port by applying a sealing mechanism to the first portion of the drainage spout, wherein the sealing mechanism comprises at least one of Teflon tape and a liquid sealant.

In an Example 20, the method of any of Examples 18 and 19, wherein providing the water collection system comprises: placing a pan under the second end of the second portion of the drainage spout, wherein the second end of the second portion comprises a protrusion configured to focus a stream of liquid exiting the container through the drainage spout; or coupling a conduit to the second end of the second portion, wherein the second end of the second portion is configured to be coupled to a conduit such that liquid exiting the container through the drainage spout flows into the conduit.

BRIEF DESCRIPTION OF THE DRAWINGS

FIG. 1F is a front view of a drainage spout, in accordance with embodiments of the disclosure;

FIG. 1G is a perspective view of the drainage spout depicted in FIG. 1F, in accordance with embodiments of the disclosure;

Figure 1B:
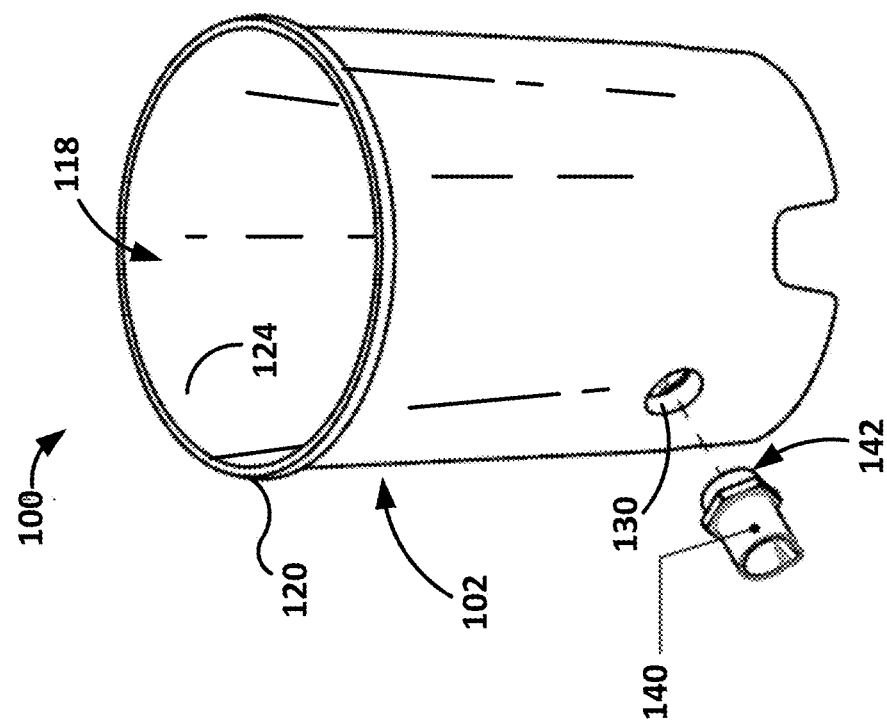
FIG. 1B is a perspective view of the plant growing system depicted in FIG. 1A, in accordance with embodiments of the disclosure.

While the subject matter disclosed herein is amenable to various modifications and alternative forms, specific embodiments have been shown by way of example in the drawings and are described in detail below. The disclosed subject matter, however, is not limited to the particular embodiments described. On the contrary, the disclosure is intended to cover all modifications, equivalents, and alternatives falling within the ambit of the subject matter disclosed herein, as defined by the appended claims.

DETAILED DESCRIPTION

Embodiments include a plant growing system having a floor surface that is raised off the surface upon which the plant growing system sits, making room for a collection pan, plumbing, and/or the like. The plant growing system includes a container having a drainage port disposed in the side of the container. The drainage port is configured to enable excess liquid to drain from the container. The drainage port may be configured to receive a plumb-able drainage spout and/or a manual-collection drainage spout. In embodiments, the plumb-able drainage spout and/or the manual-collection drainage spout may have an aperture configured to facilitate an air supply to the roots. The drainage spout may also include a grate configured to keep the growing medium in place within the container. In embodiments, a sloped gutter adjacent the drainage port may facilitate drainage of the container.

Figure 1A:
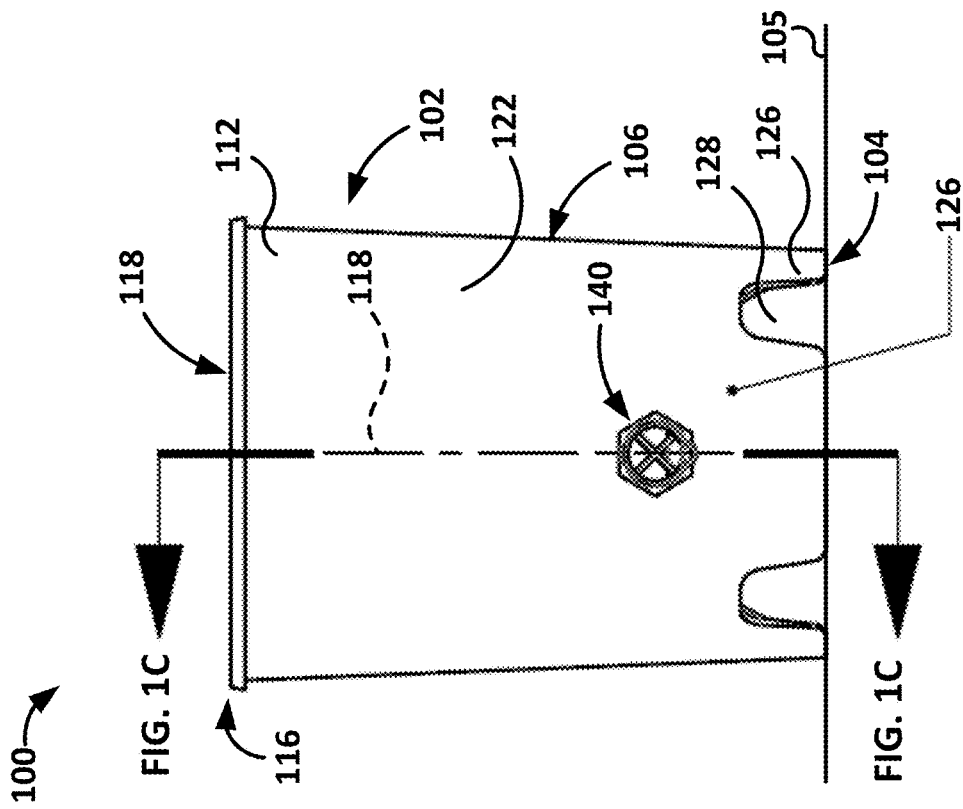
FIG. 1A is a side view of a plant growing system, in accordance with embodiments of the disclosure.

FIG. 1A is a side view of a plant growing system 100, in accordance with embodiments of the disclosure; and FIG. 1B is a perspective view the plant growing system 100, in accordance with embodiments of the disclosure. As shown in FIGS. 1A and 1B, the plant growing system 100 includes a container 102 disposed on top of a base component 104, which is configured to sit on a surface 105 such as, for example, a shelf, a tray, a table, a floor, and/or the like. In embodiments, the container 102 and the base component 104 may be two separate components coupled together. The base component 104 may be fixed to the container 102 such as by fusing, melting, welding, and/or the like. In embodiments, the base component 104 may be releasably coupled to the container 102. That is, for example, the base component 104 may include a male or female thread configured to engage a female or male thread, respectively, disposed on the container 102. Any other means of releasably coupling the base component 104 to the container 102 may be implemented in embodiments of the disclosure. In other embodiments, the base component 104 may be integrated with the container 102.

The container 102 includes a container body 106 having a floor surface 108 at a lower end 110, and a wall 112 having a lower edge 114 coupled to the floor surface 108 and extending upward from the perimeter of the floor surface 108 to an upper edge 116. The upper edge 116 may form a perimeter around an opening 118, and may include a lip 120 or other edge feature. The wall 112 includes an outside surface 122 and an opposite-facing inside surface 124.

The base component 104 may include any number of mechanisms configured to raise the floor surface 108 off of the surface 105 upon which the base component 104 sits. For example, in embodiments, the base component 104 may include a number of blade features 126 separated by a number of gaps 128. In other embodiments, the base component 104 may include a number of legs and/or other structures for raising the floor surface 108 above the surface 105 upon which the base component 104 is placed. According to embodiments, the base component 104 may have any number of different configurations, including that of a solid wall, so long as the base component 104 provides a space between the elevation of the floor surface 108 and the surface 105 upon which the base component 104 sits.

Figure 1C:
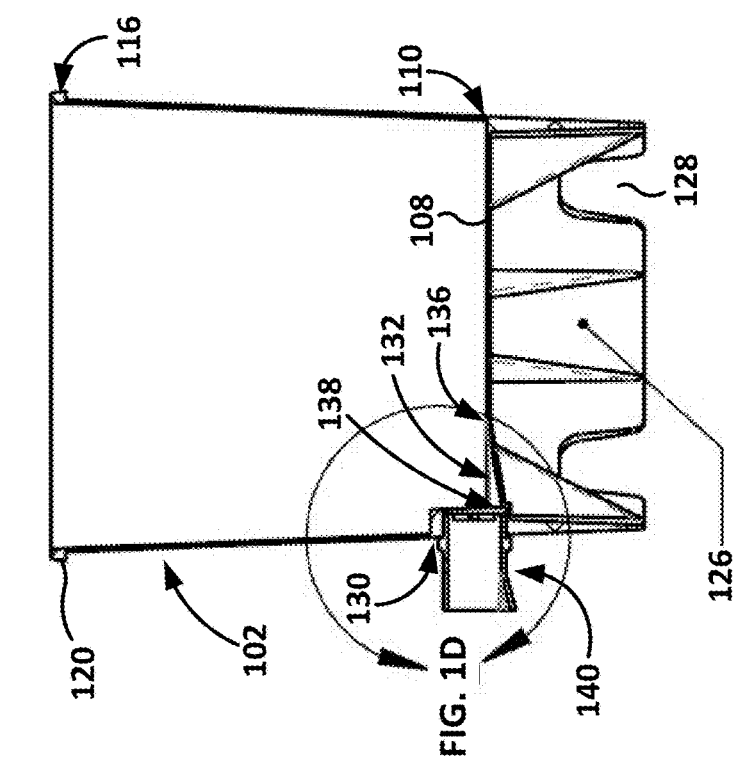
FIG. 1C is a side cross-sectional view of the plant growing system depicted in FIG. 1A, in accordance with embodiments of the disclosure.
Figure 1E:
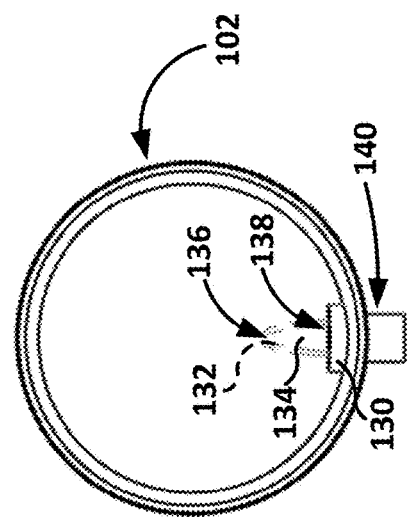
FIG. 1E is a top view of the plant growing system depicted in FIG. 1A, in accordance with embodiments of the disclosure.
Figure 1D:
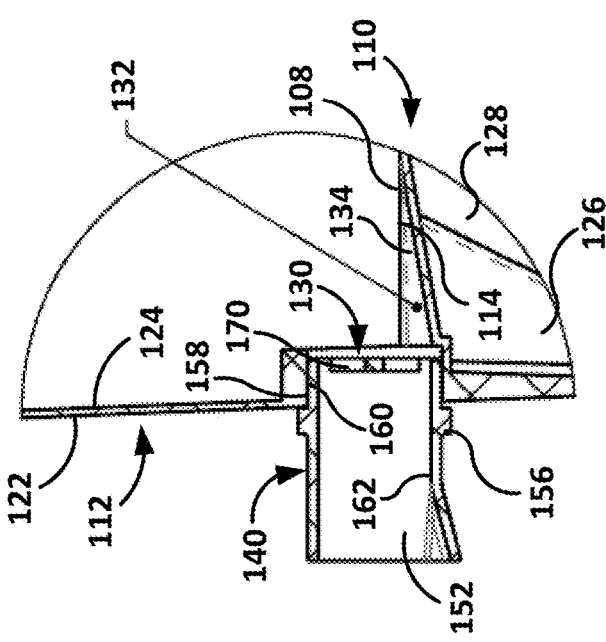
FIG. 1D is a side cross-sectional view of a portion of the plant growing system depicted in FIG. 1A, in accordance with embodiments of the disclosure.

A drainage port 130 is disposed through the wall 112 near the lower edge 114 of the wall 112. The container 102 includes a gutter 132 defined in the floor surface 108. As shown in FIGS. 1D and 1E, the gutter 132 comprises a downward sloping surface 134 extending from a first end 136 of the gutter 132 to a second end 138 of the gutter 132. The second end 138 of the gutter 132 is disposed adjacent to the drainage port 130. As shown in FIG. 1C, for example, the gutter surface 134 is sloped at least partially toward the drainage port 130. The gutter surface 134 may be configured according to any number of different shapes and may include smooth transitions, angular features, a rectangular shape, a triangular shape, a tear-drop shape, and/or the like.

A drainage spout 140 may be configured to be coupled to the container 102 such that the drainage spout 140 is in fluid communication with the drainage port 130, allowing fluid (e.g., water and/or nutrient solution) to flow out of the container 102, via the drainage port 130, and into the drainage spout 140. For example, the drainage spout 140 may include a first portion 142 that is configured to be at least partially inserted into the drainage port 130. As shown, for example, in FIGS. 1F and 1G, the drainage spout 140 also includes a second portion 144. The second portion 144 may include a first end 146 coupled to the first portion 142, a second end 148, and a wall 150 extending away from the first portion 142 between the first end 146 and the second end 148. A fluid lumen 152 may be defined through the drainage spout 140, extending from a first end 154 of the first portion 142 to the second end 148 of the second portion 144.

A collar 156 may be disposed between the first portion 142 and the second portion 144. The collar 156 may be configured to engage the outer surface 122 of the container 102, thereby limiting the amount by which the drainage spout 140 can be inserted into the drainage port 130. As shown in FIGS. 1F and 1G, the collar 156 may include a polygonal shape such that it can be gripped by a wrench or other tool to facilitate insertion and extraction of the drainage spout 140 into and from the drainage port 130. In embodiments, the first portion 142 of the drainage spout 140 may include a screw thread configured to mate with a corresponding thread disposed on the inside of the drainage port 130, in which case the collar 156 may be configured to be gripped by a torque-applying tool such as a wrench, pliers, and/or the like, which may be used to screw the drainage spout 140 into place in the drainage port 130.

According to embodiments, the drainage spout 140 may be configured to be coupled to the container 102 in any number of different ways. For example, the drainage spout 140 may be configured to be releasably coupled to the container 102 using an interference fitting. That is, for example, the drainage spout 140 and the drainage port 130 may be respectively configured such that, when the first portion 142 of the drainage spout 140 is inserted into the drainage port 130, the outside surface 158 of the first portion 142 of the drainage spout 140 frictionally engages a corresponding inside surface 160 of the drainage port 130, thereby holding the drainage spout 140 in place.

As shown, for example, in FIG. 1D, the drainage port 130 may be disposed adjacent the floor surface 108 to facilitate effective draining of excess liquid (e.g., water and/or nutrient solution) from the container 102 through the drainage spout 140. In embodiments, the drainage spout 140 may be located such that, when the drainage spout 140 is inserted in the drainage port 130, a lower inside surface 162 of the drainage spout 140 may be flush with, or at least approximately flush (e.g., within 1 to 10 millimeters) with, the gutter surface 134 at the second end 138 of the gutter 132.

In embodiments, as shown in FIGS. 1F and 1G, for example, the second end 148 of the second portion 144 includes a protrusion 164 configured to focus a stream of liquid exiting the second end 148 of the second portion 144 of the drainage spout 140. An inside surface 166 of the wall 150 of the second portion 144 of the drainage spout 140 may include a depression 168 that functions as a gutter to focus the stream of liquid as the liquid pours out from the lumen 152. Additionally, in embodiments, the protrusion 164 of the drainage spout may be configured according to any suitable angle 165 and/or shape such that the liquid exiting the container 102 drips down and out of the drainage spout 140 and is not likely to capillary back up the drainage spout 140. For example, in embodiments, the protrusion 164 may have a curved shape, as shown, a triangular shape, and/or the like, and the angle 165 may be any acute angle such as, for example, an angle between 5 degrees and 90 degrees (e.g., 45 degrees, 60 degrees, 75 degrees, and/or the like). Any other angle 165 configured to reduce the likelihood of liquid moving back toward the container 102 may be utilized.

As is also shown, for example in FIG. 1F, a grate 170 may be disposed in at least one of the drainage port 130 and the lumen 152 of the drainage spout 140 so that the grate 170 is disposed in the path of liquid exiting the container 102. For example, the grate 170 may be coupled to the first end 154 of the first portion 142 of the drainage spout 140. The grate 170 is configured to prevent a growing medium from exiting the container 102 via the drainage port 130.

The illustrative growing system 100 shown in FIGS. 1A-1G is not intended to suggest any limitation as to the scope of use or functionality of embodiments of the presently disclosed subject matter. Neither should the illustrative growing system 100 be interpreted as having any dependency or requirement related to any single component or combination of components illustrated therein. Additionally, any one or more of the components depicted in FIGS. 1A-1G may be, in embodiments, integrated with various ones of the other components depicted therein (and/or components not illustrated), all of which are considered to be within the ambit of the disclosed subject matter. Additionally, embodiments of components of the growing system 100 may be produced using any number of different manufacturing processes and any number of different materials. For example, components of the growing system 100 may be produced using injection molding, additive manufacturing (e.g., 3-D printing), and/or the like, and may be constructed using any combination of materials such as plastics, polymers, and/or the like.

Figure 2A:
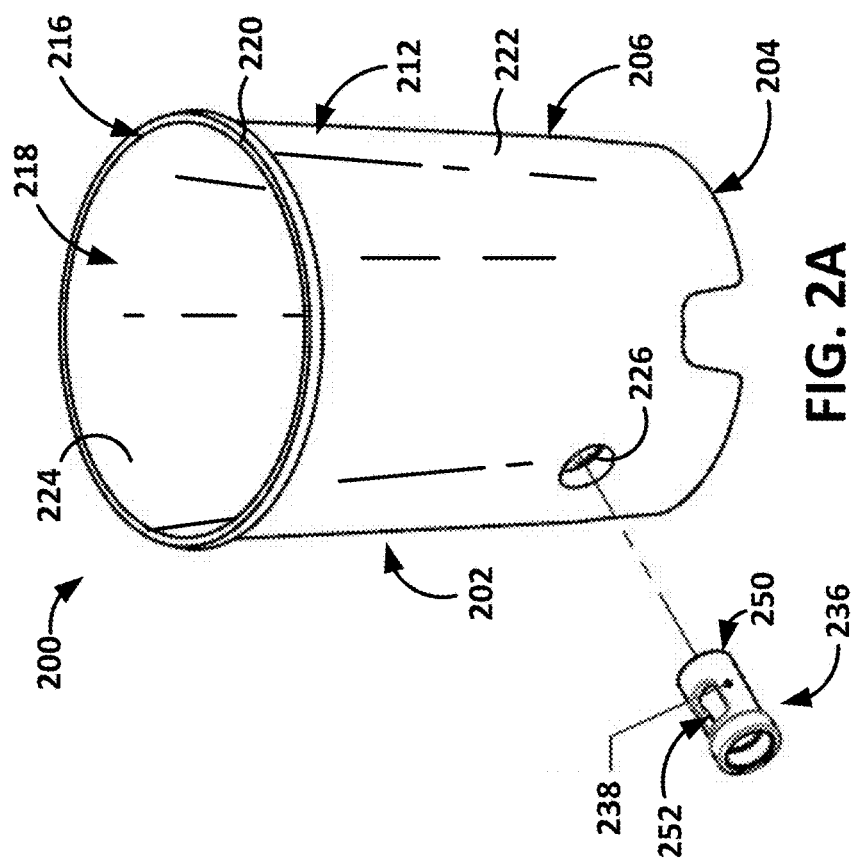
FIG. 2A is a perspective view of a plant growing system, in accordance with embodiments of the disclosure.
Figure 2B:
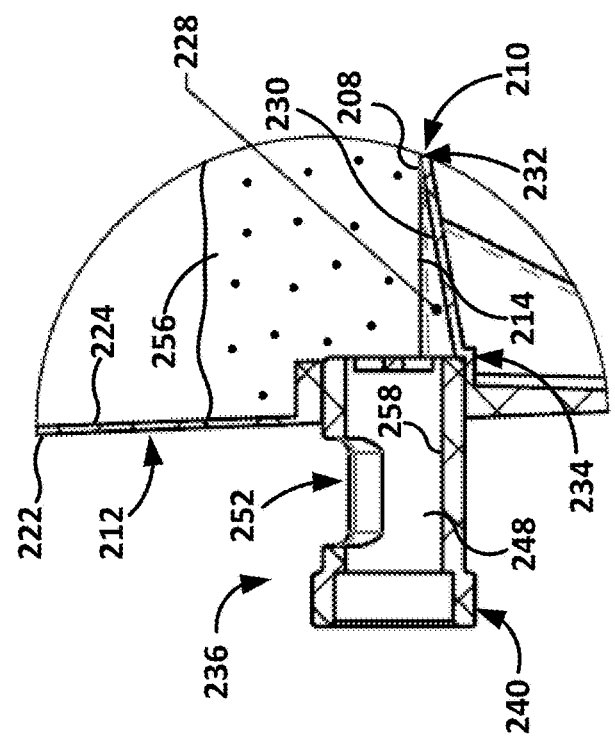
FIG. 2B is a side cross-sectional view of a portion of the plant growing system depicted in FIG. 2A, in accordance with embodiments of the disclosure.

FIGS. 2A-2D depict a plant growing system 200, in accordance with embodiments of the disclosure. As shown in FIGS. 2A and 2B, the plant growing system 200 includes a container 202 disposed on top of a base component 204. In embodiments, the container 202 and the base component 204 may be, include, and/or be similar to, the container 102 and base component 104 depicted in FIGS. 1A-1G. The container 202 includes a container body 206 having a floor surface 208 at a lower end 210, and a wall 212 having a lower edge 214 coupled to the floor surface 208 and extending upward from the perimeter of the floor surface 208 to an upper edge 216. The upper edge 216 may form a perimeter around an opening 218, and may include a lip 220 or other edge feature. The wall 212 includes an outside surface 222 and an opposite-facing inside surface 224.

A drainage port 226 is disposed through the wall 212 near the lower edge 214 of the wall 212. The container 202 includes a gutter 228 defined in the floor surface 208. As shown in FIG. 2B, the gutter 228 comprises a downward sloping surface 230 extending from a first end 232 of the gutter 228 to a second end 234 of the gutter 228. The second end 234 of the gutter 228 is disposed adjacent to the drainage port 226. As shown, for example, the gutter surface 230 is sloped at least partially toward the drainage port 226. The gutter surface 230 may be configured according to any number of different shapes and may include smooth transitions, angular features, a rectangular shape, a triangular shape, a tear-drop shape, and/or the like.

A drainage spout 236 may be configured to be coupled to the container 202 such that the drainage spout 236 is in fluid communication with the drainage port 226, allowing fluid (e.g., water and/or nutrient solution) to flow out of the container 202, via the drainage port 226, and into the drainage spout 236. In embodiments, the drainage spout 236 may be, include, and/or be similar to the drainage spout 140 depicted in FIGS. 1A-1G.

In the embodiments illustrated in FIGS. 2A-2D, the drainage spout 236 may include a first portion 238 that is configured to be at least partially inserted into the drainage port 226. The drainage spout 236 also includes a second portion 240. The second portion 240 may include a first end 242 coupled to the first portion 238, a second end 244, and a wall 246 extending away from the first portion 238 between the first end 242 and the second end 244. A fluid lumen 248 may be defined through the drainage spout 236, extending from a first end 250 of the first portion 238 to the second end 244 of the second portion 240. An aperture 252 may be defined in a wall 254 of the first portion 238. The aperture 252 may be configured to allow a gas (e.g., air) to be provided to a growing medium 256 disposed within the container 202, thereby enabling aeration of the growing medium 256. In embodiments, the aperture 252 may facilitate providing the gas to the growing medium 256 to replace liquid exiting the growing medium 256, thereby facilitating drainage. Although not illustrated in FIGS. 2A-2D, the drainage spout 236 may include a collar or other feature configured to facilitate limiting the depth of insertion of the drainage spout 236 into the drainage port 226, securing the drainage spout 236 to the container 202, and/or the like. Additionally, as described above with respect to the drainage spout 140 depicted in FIGS. 1A-1G, the drainage spout 236 may be configured to be coupled to the container 202 in any number of different ways.

As shown, for example, in FIG. 2B, the drainage port 226 may be disposed adjacent the floor surface 208 to facilitate effective draining of excess liquid (e.g., water and/or nutrient solution) from the container 202 through the drainage spout 236. In embodiments, the drainage port 226 may be located such that, when the drainage spout 236 is inserted in the drainage port 226, a lower inside surface 258 of the drainage spout 236 may be flush with, or at least approximately flush (e.g., within 1 to 10 millimeters) with, the gutter surface 230 at the second end 234 of the gutter 228.

In embodiments, the second end 244 of the second portion 240 of the drainage spout 236 may be configured to be coupled to a conduit (not shown) such that liquid exiting the container 202 through the drainage spout 236 flows into the conduit. The conduit may be, include, or be included in a tube, pipe, or other structure configured to move liquid from the drainage spout 236 to another location. In this manner, for example, the drainage spout 236 may be coupled to a drainage system configured to remove and/or recycle liquid that drains from the container 202. According to embodiments, the second end 244 of the second portion 240 may be sized to fit a particular type of conduit, and/or may include a mating feature 260 such as, for example, an internal collar that facilitates an interference fitting of the drainage spout 236 with a conduit, a threading configured to mate with corresponding threading on the conduit, a clamp mechanism, and/or the like.

Figure 2D:
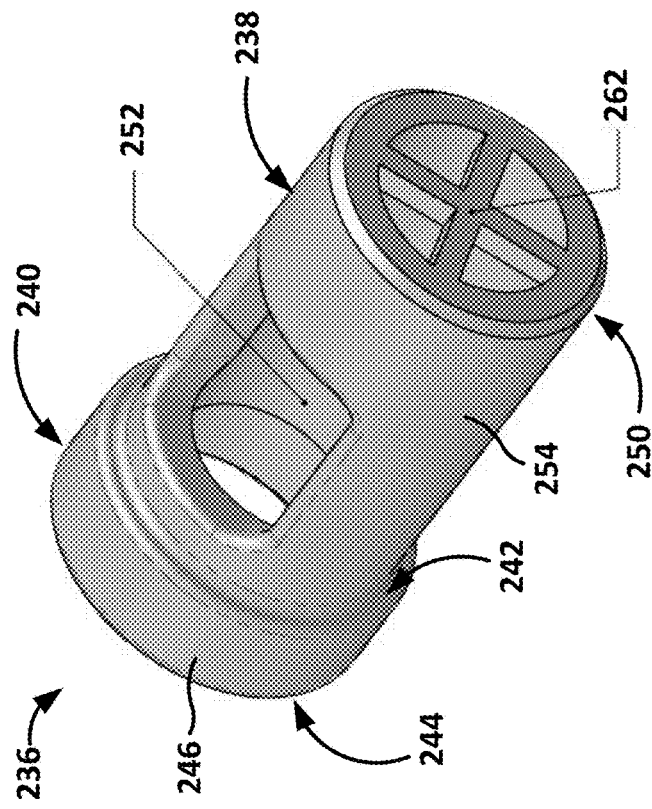
FIG. 2D is another perspective view of the drainage spout depicted in FIG. 2C, in accordance with embodiments of the disclosure.
Figure 2C:
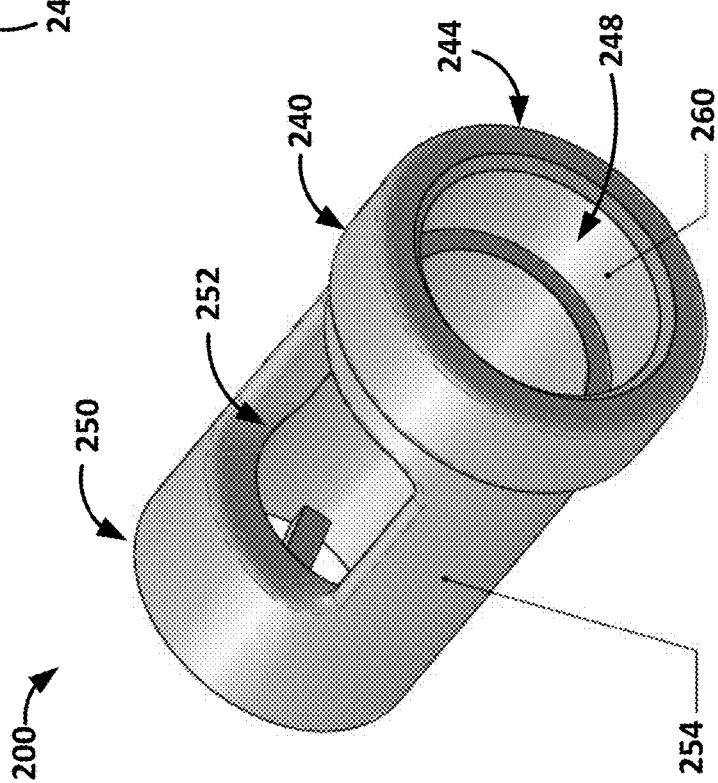
FIG. 2C is a perspective view of another drainage spout, in accordance with embodiments of the disclosure.

A grate 262 may be disposed in at least one of the drainage port 226 and the lumen 248 of the drainage spout 236 so that the grate 262 is disposed in the path of liquid exiting the container 202. For example, as shown in FIG. 2D, the grate 262 may be coupled to the first end 250 of the first portion 238 of the drainage spout 236. In embodiments, the grate 262 may be integrated with the first portion 238 of the drainage spout 236. The grate 262 is configured to prevent the growing medium 256 from exiting the container 202 via the drainage port 226.

The illustrative growing system 200 shown in FIGS. 2A-2D is not intended to suggest any limitation as to the scope of use or functionality of embodiments of the presently disclosed subject matter. Neither should the illustrative growing system 200 be interpreted as having any dependency or requirement related to any single component or combination of components illustrated therein. Additionally, any one or more of the components depicted in FIGS. 2A-2D may be, in embodiments, integrated with various ones of the other components depicted therein (and/or components not illustrated), all of which are considered to be within the ambit of the disclosed subject matter. Additionally, embodiments of components of the growing system 200 may be produced using any number of different manufacturing processes and any number of different materials. For example, components of the growing system 200 may be produced using injection molding, additive manufacturing (e.g., 3-D printing), and/or the like, and may be constructed using any combination of materials such as plastics, polymers, and/or the like.

Figure 3:
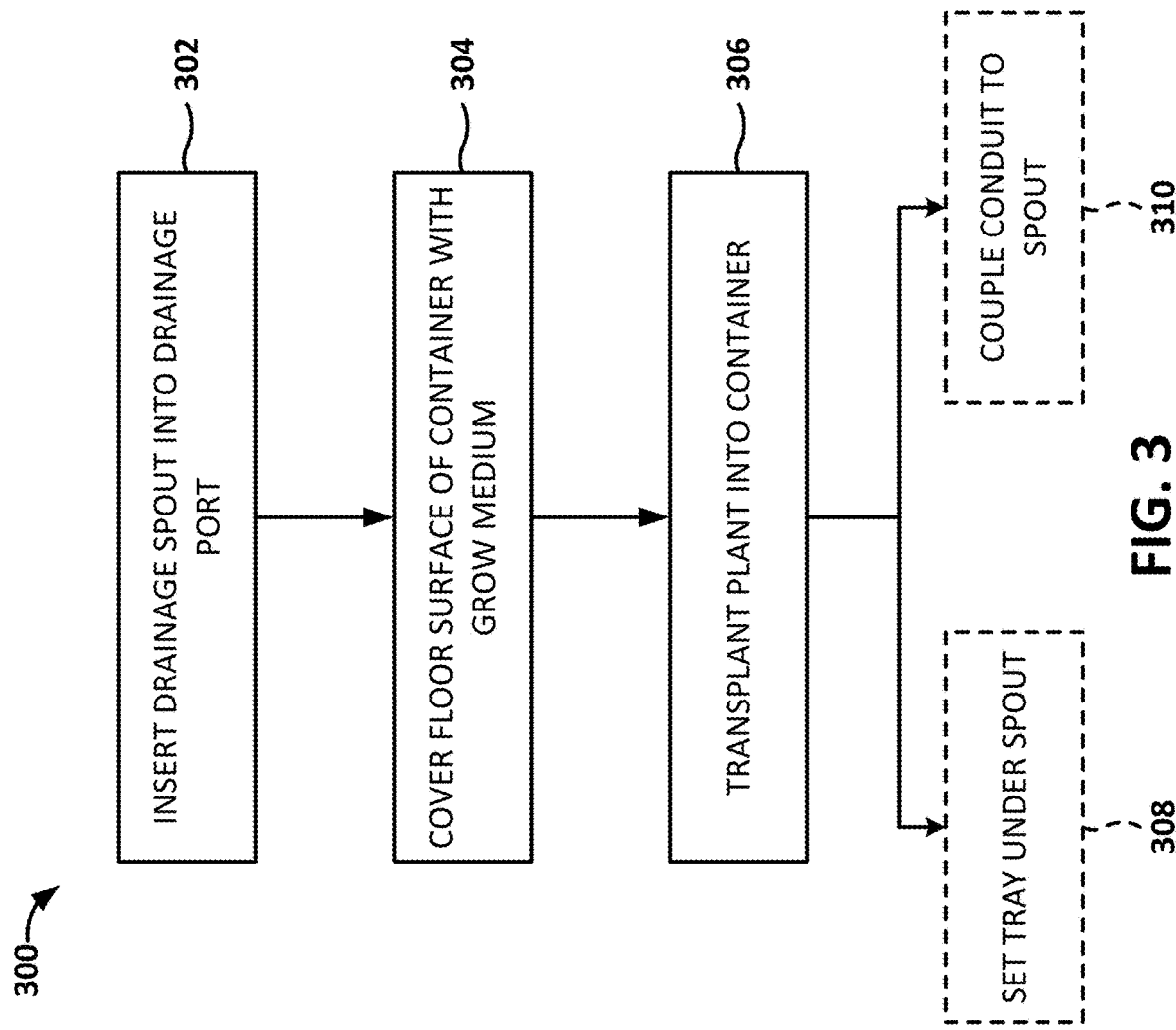
FIG. 3 is a flow diagram depicting a method of growing a plant using a plant growing system, in accordance with embodiments of the disclosure.

According to embodiments, a person may use embodiments of the plant growing system disclosed herein to grow a plant. FIG. 3 is a flow diagram depicting a method 300 for growing a plant using a plant growing system (e.g., the plant growing system 100 depicted in FIGS. 1A-1G, and/or the plant growing system 200 depicted in FIGS. 2A-2D), in accordance with embodiments of the disclosure. Embodiments of the method 300 may include, for example, inserting a drainage spout into the drainage port (block 302), (e.g., using teflon tape or other sealant to prevent seepage); covering the floor surface of the container with a grow medium (block 304) (e.g., 1½ inches of highly permeable grow medium such as perlite and/or expanded clay balls); transplanting a plant into the container (block 306); and, if using a manual-collection drainage spout, setting a tray under the spout to catch liquid run-off (block 308); or, if using a plumb-able drainage spout, coupling a conduit to the spout to direct the excess liquid to a desired location (block 310). In embodiments, for example, a drain pipe system may be configured to connect to many plant containers and collect from each container (e.g., with standard PVC pipe and fittings).

While embodiments of the subject matter disclosed herein are described with specificity, the description itself is not intended to limit the scope of this patent. Thus, the inventors have contemplated that the claimed subject matter might also be embodied in other ways, to include different steps or features, or combinations of steps or features similar to the ones described in this document, in conjunction with other technologies.

The following is claimed:

1. A plant growing system, comprising:
   a base component; and
   a container disposed on top of the base component, wherein the container comprises:
      a container body having a floor surface at a lower end,
      a gutter defined in the floor surface and having an inlet plane coplanar with the floor surface, the gutter having a downward slope extending from a first end of the gutter to a second end of the gutter, and the container body further having a first wall having a lower edge coupled to the floor surface and extending upward from the perimeter of the floor surface to an upper edge;

a drainage port disposed through the first wall near the lower edge of the first wall, and the drainage port disposed adjacent to the second end of the gutter and intersected by the inlet plane;

a drainage spout configured to be partially inserted into the drainage port and intersected by the inlet plane, the drainage spout comprising:
- a first end;
- a second end;
- a second wall extending between the first end and the second end; and
- a fluid lumen defined through the drainage spout and extending from the first end and the second end, the fluid lumen facilitating fluid drainage from the container via the drainage port.

2. The system of claim 1, wherein the second end of the drainage spout is configured to be coupled to a conduit such that liquid exiting the container through the drainage spout flows into the conduit.

3. The system of claim 1, wherein the gutter further comprises a ledge configured to receive the drainage spout.

4. The system of claim 1, wherein the drainage spout further comprises a collar disposed between the first end and the second end, the collar being configured to engage an outer surface of the container body and thereby limit an amount by which the drainage spout is insertable into the drainage port.

5. The system of claim 4, wherein the collar has a polygonal shape that is configured to be gripped by a torque-applying tool.

6. A method of using the plant growing system of claim 1, the method comprising:
- inserting the first end of the drainage spout into the drainage port of the container;
- covering the floor surface of the container with a grow medium;
- transplanting a plant into the container;
- providing a water collection system; and
- adding water to the grow medium in the container.

7. The method of claim 6, further comprising sealing the drainage port by applying a sealing mechanism to the drainage spout, wherein the sealing mechanism comprises at least one of Teflon tape and a liquid sealant.

8. The method of claim 6, wherein providing the water collection system comprises coupling a conduit to the second end of the drainage spout, and further comprising permitting water in the container to drain to the conduit via the drainage spout.

9. A plant growing system, comprising:
a base component;
a container disposed on top of the base component, wherein the container comprises:
  a container body having a floor surface at a lower end and a gutter defined in the floor surface, the gutter having an inlet plane coplanar with the floor surface, the gutter comprising a downward slope extending from a first end of the gutter to a second end of the gutter, and the container body further having a wall having a lower edge coupled to the floor surface and extending upward from the perimeter of the floor surface to an upper edge; and
  a drainage port disposed through the wall near the lower edge of the wall and intersected by the inlet plane, and the second end of the gutter being disposed adjacent to the drainage port; and
a drainage spout comprising:
  a first portion that is configured to be communicably coupled to the drainage port such that the drainage spout is intersected by the inlet plane, the first portion comprising an aperture; and
  a second portion comprising a first end coupled to the first portion, a second end, and a wall extending away from the first portion between the first end and the second end.

10. The system of claim 9, wherein the gutter further comprises a ledge configured to receive the drainage spout.

11. The system of claim 9, wherein the second end of the second portion comprises a depression configured to focus a stream of liquid exiting the container through the drainage spout.

12. The system of claim 9, wherein the second end of the second portion is configured to be coupled to a conduit such that liquid exiting the container through the drainage spout flows into the conduit.

13. The system of claim 9, further comprising a grate disposed in at least one of the drainage port and the drainage spout, wherein the grate is configured to prevent a growing medium from exiting the container via the drainage port.

14. A method of using the plant growing system of claim 9, the method comprising:
- inserting the first portion of the drainage spout into the drainage port of the container;
- covering the floor surface of the container with a grow medium;
- transplanting a plant into the container;
- providing a water collection system; and
- adding water to the grow medium in the container.

15. The method of claim 14, wherein providing the water collection system comprises coupling a conduit to the second end of the drainage spout, and further comprising permitting water in the container to drain to the conduit via the drainage spout.

16. A method of using a plant growing system, the plant growing system comprising:
a base component; and
a container disposed on top of the base component, wherein the container comprises:
  a container body having a floor surface at a lower end, a gutter defined in the floor surface, the gutter having a downward slope extending from a first end of the gutter to a second end of the gutter, and the gutter further having a ledge, the container body further having a first wall having a lower edge coupled to the floor surface and extending upward from the perimeter of the floor surface to an upper edge;
  a drainage port disposed through the first wall near the lower edge of the first wall, and the drainage port disposed adjacent to the gutter;
  a drainage spout configured to be partially inserted into the drainage port and received by the ledge of the gutter, the drainage spout comprising:
    a first end;
    a second end;
    a second wall extending between the first end and the second end;
    a fluid lumen defined through the drainage spout and extending from the first end and the second end, the fluid lumen facilitating fluid drainage from the container via the drainage port;
the method comprising:
  inserting the first end of the drainage spout into the drainage port of the container;

covering the floor surface of the container with a grow medium;
transplanting a plant into the container;
providing a water collection system; and
adding water to the grow medium in the container.

17. The method of claim 16, wherein the second end of the drainage spout is configured to be coupled to a conduit such that liquid exiting the container through the drainage spout flows into the conduit.

18. The method of claim 16, further comprising a grate disposed in at least one of the drainage port and the drainage spout, wherein the grate is configured to prevent the grow medium from exiting the container via the drainage port.

19. The method of claim 16, wherein providing the water collection system comprises coupling a conduit to the second end of the drainage spout, and further comprising permitting water in the container to drain to the conduit via the drainage spout.

\* \* \* \* \*